United States Patent [19]

Ohsato et al.

[11] Patent Number: 4,631,397
[45] Date of Patent: Dec. 23, 1986

[54] FOCUSSING ERROR DETECTING APPARATUS EMPLOYING A COMPOSITE LENS

[75] Inventors: Kiyoshi Ohsato, Chiba; Shigeo Kubota, Tokyo, both of Japan

[73] Assignee: Sony Corporation, Tokyo, Japan

[21] Appl. No.: 614,995

[22] Filed: May 29, 1984

[30] Foreign Application Priority Data

May 31, 1983 [JP] Japan ................... 58-96058

[51] Int. Cl.$^4$ ................................................. G01J 1/20
[52] U.S. Cl. ........................................ 250/201; 369/45
[58] Field of Search ................. 250/201 AF, 201 DF, 250/201 R; 369/44–46, 112, 120–122; 354/402, 403, 404, 409; 358/342

[56] References Cited

U.S. PATENT DOCUMENTS

| 4,376,303 | 3/1983 | Lurie | 369/45 |
| 4,513,408 | 4/1985 | Nomura et al. | 369/46 |

FOREIGN PATENT DOCUMENTS

0097140  6/1983  Japan ................................ 369/45

Primary Examiner—David C. Nelms
Assistant Examiner—L. W. Madoo
Attorney, Agent, or Firm—Lewis H. Eslinger; Alvin Sinderbrand

[57] ABSTRACT

Focussing error detecting apparatus includes a composite lens formed of a single glass lens and a single plastic lens and a photodetector disposed behind the composite lens in opposed relation thereto. The glass lens has a uniform focal length, the plastic lens is formed of a pair of lens regions divided by a flat interface including an optical axis of light incident on the composite lens, and the pair of lens regions have back focal lengths different from each other and optical axes spaced apart from each other. The photodetector is placed so that its photodetecting face is at a middle point between converged points of light emitted from the pair of lens regions on the optical axis of the incident light when the light incident on the composite lens is focussed. The photodetector comprises first and second photodetecting sensors for receiving light passed through portions of the first lens region which are respectively spaced apart from and adjacent to the flat interface and third and fourth photodetecting sensors for receiving light passed through portions of the second lens region which are respectively spaced apart from and adjacent to the flat interface so that a focusing error signal is produced from the difference between the sum of first and fourth photodetected signals from the first and fourth photodetecting sensors and the sum of second and third photodetected signals from the second and third photodetecting sensors.

2 Claims, 36 Drawing Figures

FOCUSSING ERROR DETECTING APPARATUS EMPLOYING A COMPOSITE LENS

BACKGROUND OF THE INVENTION

1. Field of the Invention

The present invention relates to a focussing error detecting apparatus suitable for being applied to an optical disc reproducing apparatus, an auto focus camera (an imager) and so on.

2. Description of the Prior Art

Various types of focussing error detectors have hitherto been proposed for optical disc reproducing apparatus. One such type having a simple optical system for detecting a focussing error is the combination of a Foucault prism and a photodetector having 4 photosensors arranged in line.

Figure 1:
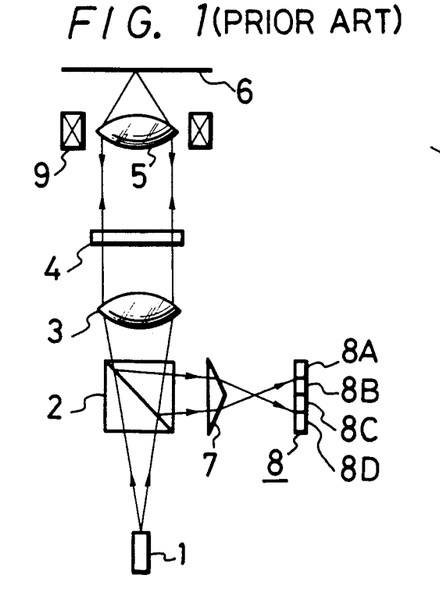
FIG. 1 is a diagram schematically showing the arrangement of a conventional focussing error detecting apparatus.

Laser light from a laser light source (for example, a semiconductor laser source) 1 passes serially through a polarized beam splitter 2, a collimator lens 3, a ¼ wavelength plate 4 and an objective lens 5 and is incident on a recorded surface 6 of a disc. On the recorded surface 6 of the disc are recorded pits that are modulated by audio or video information along a spiral track so as to be optically read out. The laser light reflected from the recorded surface 6 passes serially through the objective lens 5, the ¼ wavelength plate 4, the collimator lens 3, the polarized beam splitter 2 and a prism 7 and is incident on a photodetector 8.

Figure 2:
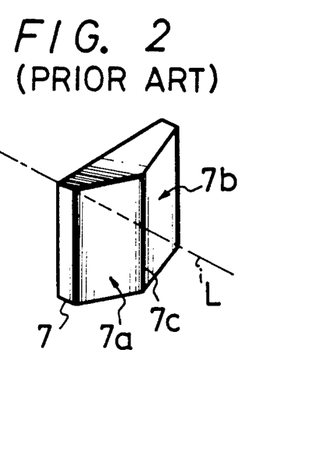
FIG. 2 is a perspective view of a prism used therein.

The prism 7 has two rectangular refractive surfaces 7a and 7b making an obtuse angle as shown in FIG. 2. The prism 7 is arranged so that light emerges from the refractive surfaces 7a and 7b and that the edge line 7c made by the refractive surfaces 7a, 7b crosses perpendicularly to the optical axis L. The photo detector 8, as shown in FIG. 3, has photosensors 8A, 8B, 8C and 8D the photodetecting surfaces of which lie in the plane perpendicular to the optical axis L and which are arranged in a row in the X-direction perpendicular to both the optical axis L and the edge line 7c. In addition, the four photosensors are disposed at a proper position along the optical axis L and in the X direction. The photodetector produces a difference signal $(S_A+S_D)-(S_B+S_C)$ between the sum signal $S_A+S_D$ of the photo-detected signals $S_A$ and $S_D$ from the outside sensors 8A and 8D and the sum signal $S_B+S_C$ of the photo-detected signals $S_B$ and $S_C$ from the inside sensors 8B and 8C, as a focussing error signal.

The objective lens 5 is moved in the optical axis direction by the current flowing through a control coil 9, and the focussing error signal is supplied to the control coil 9 as a focussing control signal.

Figure 3A:
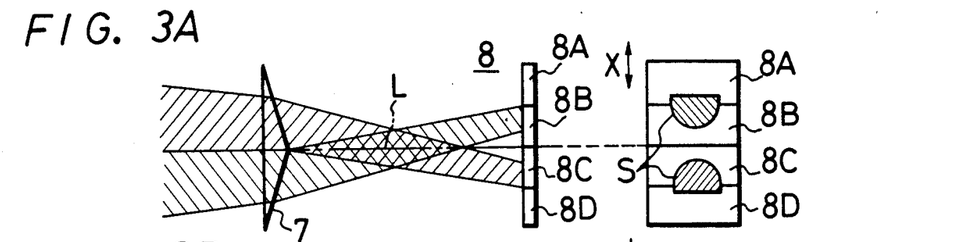
FIGS. 3A, 3B and 3C are a diagrams useful for explaining the operation of the apparatus in FIG. 1 in each focussed state thereof.
Figure 3B:
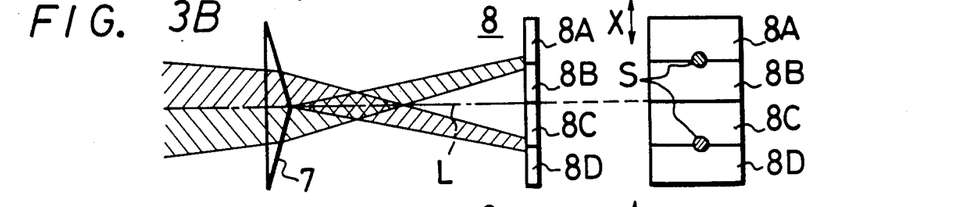

In this prior art apparatus, when the recorded surface 6 of the disc is properly positioned relative to the objective lens 5 to achieve a precisely focussed state, the spot S on the photodetector 8 appears as dots on the boundaries between the sensors 8A and 8B and between the sensors 8C and 8D as shown in FIG. 3B. Accordingly, in this case, the focussing error signal becomes zero and the objective lens 5 keeps its present position.

When the recorded surface 6 of the disc becomes nearer to the objective lens 5 to bring under-focussed state, the spot S on the photo detector 8 appears as semicircles on the inside sensors 8B and 8C. Accordingly, in this case, the focussing error signal becomes negative, and thus the objective lens 5 is moved away from the recorded surface 6.

Figure 3C:
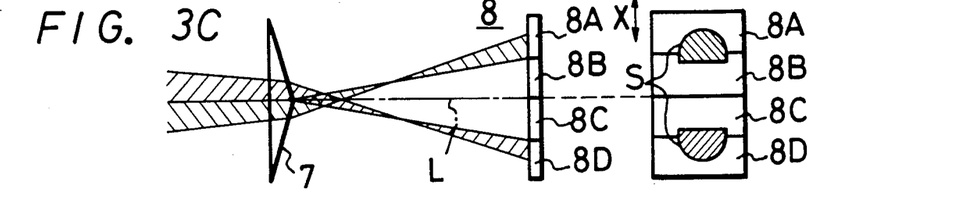

On the contrary, when the recorded surface 6 of the disc is positioned too distant from the objective lens 5, the spot S on the photodetector 8 appears as semicircles on the outside sensors 8A and 8D as shown in FIG. 3C. Accordingly, in this case, the focussing error signal becomes positive and thus the objective lens 5 is moved toward the recorded surface 6.

As described above, the prism 7 and the photodetectors 8 having 4 photosensors 8A to 8D arranged in line are combined to detect the focussing error, namely, the distance between the disc and the objective lens 5. This error signal is then supplied to the control coil 9 as the focus control signal to automatically control the objective lens 5 to maintain a precisely focussed state, or be to always at a constant distance from the disc.

However, this prior art apparatus has the disadvantage that the photodetector 8 must be disposed at a correct position relative to the optical axis L direction and to the X-direction so as to receive the spot S on the photodetector 8 under each focussed state as shown in FIGS. 3A to 3C, thus the photodetector 8 being required to be adjusted in position with severely high precision. Moreover, since some light is lost at the apexes of the prism 7 and its apex forms the edge line 7c, much light is lost at the edge line. In order to reduce the loss of light, it is necessary to raise the precision of the finishing of the apex.

A conventional focussing error detecting apparatus with the above defects obviated will be described next.

Figure 4:
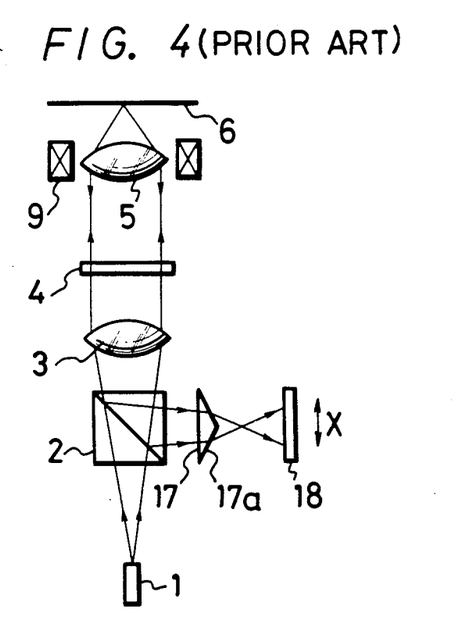
FIG. 4 is a diagram schematically showing the arrangement of another conventional focussing error detecting apparatus.
Figure 5A:
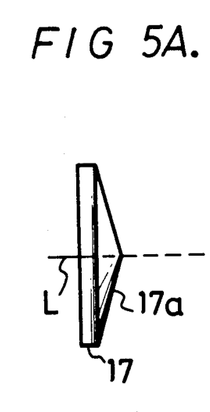
FIGS. 5A and 5B are side and front views of a lens used therein.
Figure 5B:
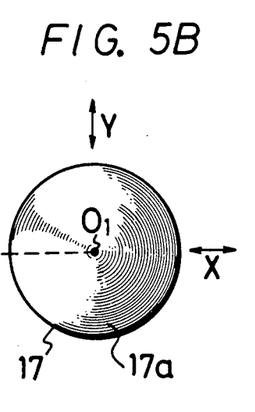
Figure 6:
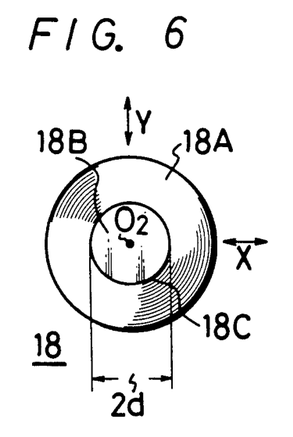
FIG. 6 is a diagram showing the arrangement of a photo detector used therein.

FIG. 4 shows an example of such apparatus which uses a lens with a conical refractive surface instead of the above prism 7. On the optical path from the polarized beam splitter 2 to a photodetector (PIN photodiode, for example) 18 is disposed a lens 17 having a conical refractive surface 17a with its refractive surface at the light emerging side. In this case, as shown in FIG. 5, the lens 17 is positioned with its center $O_1$ lying on the optical axis L. Further, as shown in FIG. 6, the photodetector 18 is formed of two concentric photosensors 18A and 18B and positioned with the center $O_2$ of the concentric circles lying on the optical axis L. In this case, as shown in FIG. 7, if the basic angle of the lens 17 is taken as $\theta$ and the radius of the dead zone (separating zone) between the sensors 18A and 18B of the photo detector 18 is taken as d, the distance l between the lens 17 and the photodetector 18 is so selected as to satisfy $l = d \cot\beta$ under which the light passed through the lens 17 at its portion quite close to the optical axis L reaches the dead zone 18C between the elements 18A and 18B. In this expression, $\beta$ is the angle given by $\sin(\beta+\theta) = n \sin\theta$ and n is a refractive index of glass forming the lens 17. Then, the difference signal $S_A - S_B$ between the photodetected signals $S_A$ and $S_B$ from the sensors 18A and 18B is generated as a focussing error signal and this error signal is supplied to the control coil 9 as the focussing control signal.

Figure 7A:
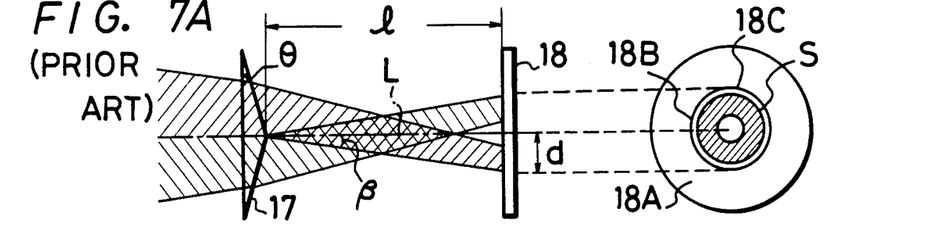
FIGS. 7A, 7B and 7C are diagrams useful for explaining the operation of the apparatus in FIG. 4 in each focussed state.
Figure 7B:
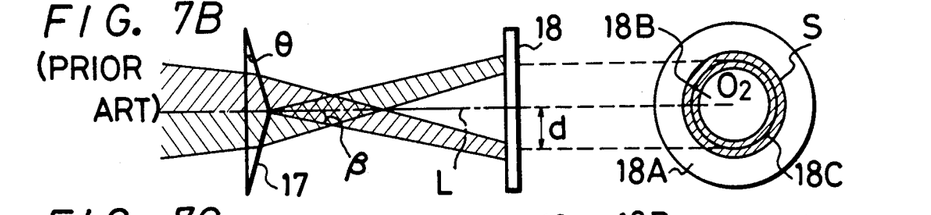

In this apparatus, when the recorded surface 6 of the disc is at a proper position relative to the objective lens 5 to achieve the precisely focussed state, as shown in FIG. 7B the spot S on the photodetector 18 appears as an annular shape on the dead zone 18C between the sensors 18A and 18B. Accordingly, in this case, the focussing error signal becomes zero so that the objective lens 5 keeps its present position.

When the recorded surface 6 of the disc is at a position closer to the objective lens 5 to bring the underfocussed state, as shown in FIG. 7A, the spot S on the photodetector 18 appears as an annular shape on the inside sensor 18B. Accordingly, in this case, the focussing error signal becomes negative, thus controlling the objective lens 5 to move away from the recorded surface 6.

Figure 7C:
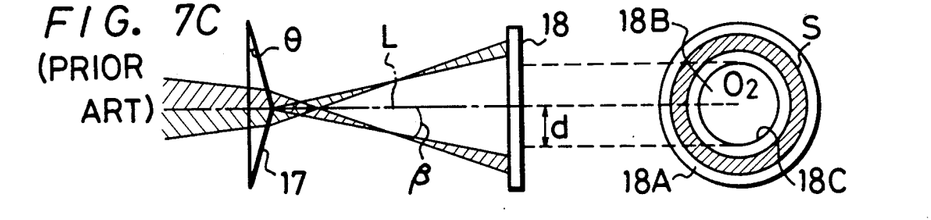

On the contrary, when the recorded surface 6 of the disc is positioned distant from the objective lens 5 to bring the over-focussed state, as shown in FIG. 7C, the spot S on the photodetector 18 appears as an annular shape on the outside sensor 18A. Accordingly, in this case, the focussing error signal becomes positive, thus controlling the objective lens 5 to move toward the recorded surface 6.

As described above, the lens 17 having the conical refractive surface 17a and the photodetector 18 formed of two concentric photosensors 18A and 18B are combined to detect the focussed state, or the distance between the disc and the objective lens 5, and this error signal is supplied to the control coil 9 as the control signal so that the objective lens 5 is automatically controlled to present the precisely focussed state, or that the distance between the objective lens and the disc remains constant at all times.

According to such apparatus as shown in FIG. 4, since the lens 17 having the conical refractive surface 17a is used in combination with the photodetector 18 formed of two concentric photosensors 18A and 18B, the alignment of the photodetector 18 becomes simple.

In other words, since in the apparatus shown in FIG. 1 the prism 7 having two rectangular refractive surfaces 7a and 7b is combined with the photodetector 8 formed of four photosensors 8A to 8D arranged in line, in FIG. 3A or 3C not only weak light passed through the center of the prism 7 and passed through the vicinity thereof but also intense light passed through portions distant from the center thereof are converged around the separating zone between sensors 8A and 8B and around the dead zone (separating zone) between the sensors 8C and 8D so as to form part of the spots of semi-circles to be formed on the inside sensors 8B and 8C or on the outer sensors 8A and 8D, and therefore the amount of light on those portions is relatively large. Thus, when the photodetector 8 is displaced in its position from the optical axis and the X-direction, and as shown in FIG. 3A or 3C, the spots extend to the outside sensors 8A and 8D or to the inside sensors 8B and 8C, the focussing error signal is changed greatly as compared with the case in which the detector is at the correct position and consequently misdetection may be made. Therefore, the adjustment of the position of the photodetector 8 relative to the optical axis direction and the X-direction must be made with high precision.

On the other hand, since the apparatus of FIG. 4 uses the lens 17 having the conical refractive surface 17a combined with the photodetector 18 formed of two concentric photodetecting sensors 18A and 18B, in FIG. 7A or 7C the portion near the dead zone 18C between the sensors 18A and 18B, of the spots to appear respectively as annular shapes on the inside sensor 18B or the outside sensor 18A has a small amount of light because of only weak light passes through the vicinity of the center of the lens 17, while the portion distant from the dead zone 18C has a large amount of light because of only intense light passes through the portion distant from the center of the lens 17. In other words, in FIG. 7A the amount of light of the spot is smaller at positions nearer to the outside, or to the dead zone 18C, and larger at positions nearer to the inside, while in FIG. 7C, the amount of light of the spot is smaller at positions nearer to the inside, or to the dead zone 18C and larger at positions near to the outside. Accordingly, when the photodetector 18 is slightly displaced relative to the optical axis direction and X- and Y-directions and in FIG. 7A or 7C the spot extends slightly to the outside sensor 18A or to the inside sensor 18B, the focussing error signal is hardly changed as compared with the case in which the photodetector is at the correct position, with the result that there is no fear of mis-detection. Therefore, it is not necessary that the photodetector 18 be adjusted in position in the optical axis direction and X- and Y-directions with considerably high precision.

Furthermore, according to the apparatus shown in FIG. 4, since the amount of light of the spot is smaller at positions nearer to the separating zone and larger at positions more distant from the separating zone and the spot extends toward the opposite direction to the separating zone as the light is defocussed more and more, the sensitivity of detection becomes considerably high.

Although the lens 17 has a loss of light at its vertex portion, such loss is small because the vertex portion thereof is not an edge line as in the conventional prism but a dot. Therefore, in order to decrease the loss, it is not necessary that the vertex be finished with a high precision.

However, the apparatus shown in FIG. 4 has the following defects. Since the focussing error signal is obtained from the difference between the amounts of light of the center and periphery of the spot S on the photodetecting surface of the photodetector 18, this focussing error signal includes a high-frequency signal leaked by the diffraction in pits on the disc. In addition, since the modulation-degree characteristic of light relative to the spatial frequency of pits at the central portion of spot S is different from that at the peripheral portion thereof, the focussing error signal obtained from the apparatus in FIG. 4 is not so high in accuracy.

Figure 8:
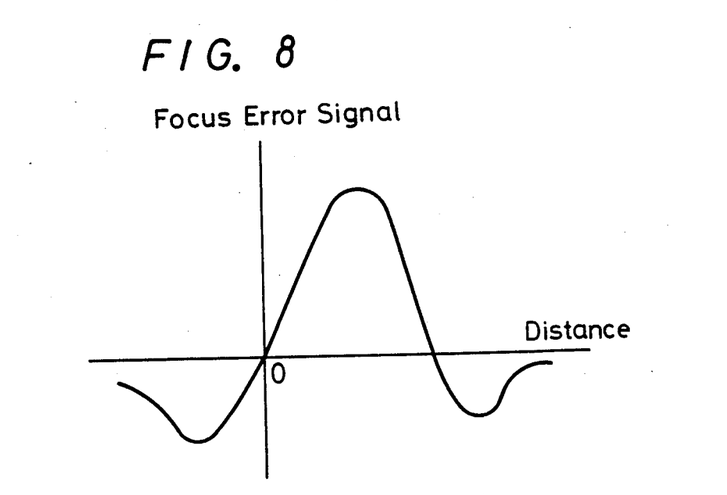
FIG. 8 is a graph useful for explaining the apparatus in FIG. 4.

Furthermore, since in the apparatus in FIG. 4, the change of radius of the spot S on the photodetector 18 is detected as a change of the area thereof, the defocussing amount versus focussing error signal characteristic curve as shown in FIG. 8 is inversely proportional to the square of the radius of the spot S near the precisely-focussed state, and thus has poor linearity.

The apparatus in FIG. 1 thus has similar defects to those of the apparatus in FIG. 4.

Another conventional focussing error detecting apparatus is proposed in which the photodetecting surface of the photodetector is formed circular, and the photodetector is equally divided into 4 photodetecting sensors of 4 quadrants in front of which a semicylindrical lens is disposed, and from which a focussing error signal is obtained by taking the difference between the sum of the photodetected signals from the first-and third-quadrant photodetecting sensors and the sum of the photodetected signals from the second-and fourth-quadrant photodetecting sensors. This apparatus will hereinafter be described with reference to the drawings.

Figure 9:
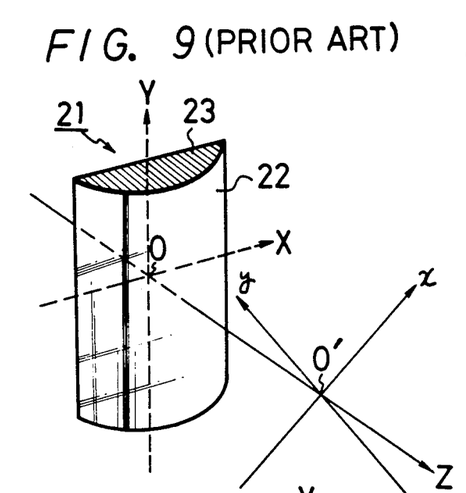
FIG. 9 is a perspective view of a semicylindrical lens used in still another conventional focussing error detecting apparatus.

FIG. 9 shows a semicylindrical lens 21 having a semicylindrical surface 22 and a rectangular surface 23. On the surface 23, rectangular coordinates with an origin O at its center are provided: the X-axis parallel to the generating line of the semicylindrical surface 22, the Y-axis perpendicular thereto and the Z-axis vertical to the surface 23. On the Z-axis is provided an origin O' at a position separated a predetermined distance from the origin O at the semicylindrical surface 22 side of the lens 21 and on the plane making a right angle with a Z-axis, are formed rectangular coordinates which are formed of the x-axis making an angle of 45° with each positive side of the X-axis and Y-axis and the y-axis making a right angle therewith. The circular detecting surface of the photodetector is made coincident with the x-y plane and the detecting surface of the photodetector is equally divided into four by the x-axis and y-axis and thus into photodetecting sensors of 4 quadrants.

Figure 10:
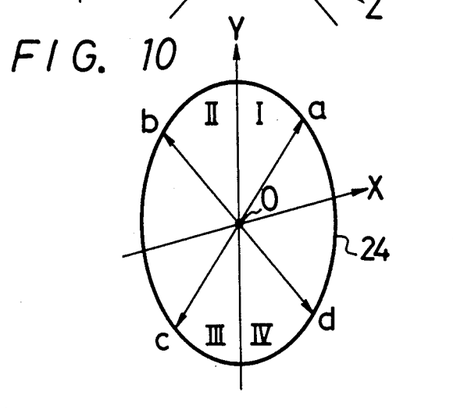
FIG. 10 is a perspective view illustrating a beam spot on the lens in FIG. 9.

On the surface 23 of the lens 21 is incident a converged beam the optical axis of which is coincident with the Z-axis and which has a circular spot 24 on the surface 23 (FIG. 10 is a perspective view) as shown in FIG. 10. Axes a to d each making an angle of 45° with X-axis and Y-axis are temporarily provided on the radius of the circular spot 24 within the first to fourth quadrants I to IV, respectively.

The loci of light rays 26 and 27 transmitted along the XOZ cross section and YOZ cross section of the lens 21 when the converged beam is incident on the surface 23 of the lens 21, will be described with reference to FIG. 11. The light ray 26 incident along the YOZ cross section of the lens 21 proceeds in the lens and emerges from the lens in parallel with the incident light, passing a point P on the Z-axis because the thickness of the YOZ cross section is constant. The light ray 25 incident along the XOZ cross section of the lens 21 is refracted to the Z-axis side and passing a point P' on the Z-axis just before the point P because the XOZ cross section constitutes a convex lens.

Figure 11:
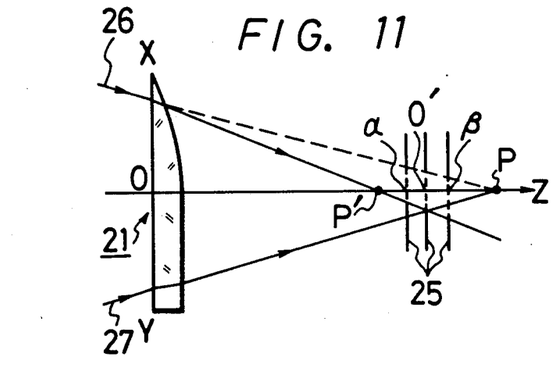
FIG. 11 is a diagram showing a locus of a light ray incident on the semi-cylindrical lens in FIG. 9.
Figure 12:
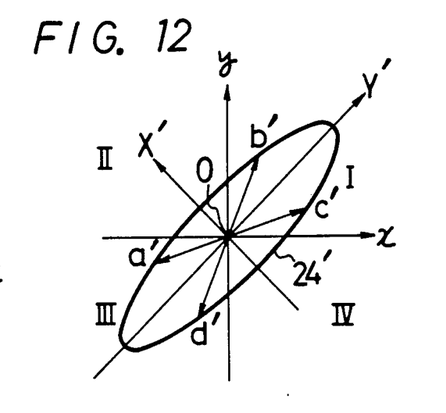
FIGS. 12 to 14 are respectively diagrams showing beam spots formed by the lens in FIG. 9.
Figure 13:
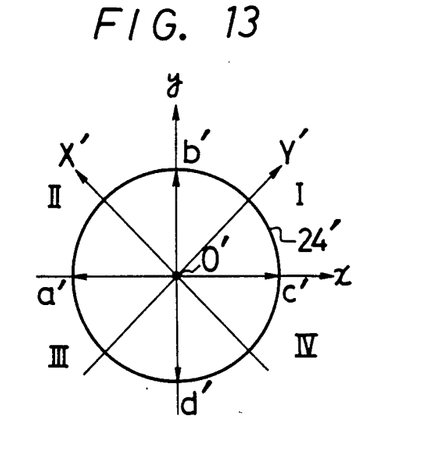
Figure 14:
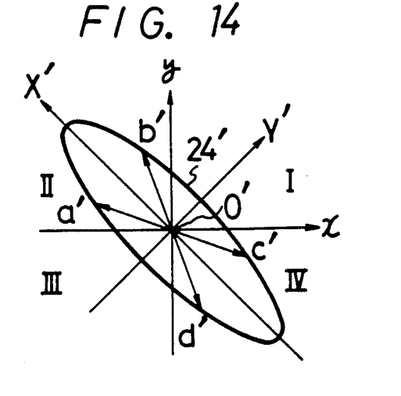

In FIG. 11, let it be assumed that when a detecting surface 25 of the photodetector is positioned at an intermediate point O' between the points P and P' (see FIG. 9) and when a spot 24' of the beam irradiated on the detecting surface 25 becomes circular as shown in FIG. 13, the converged beam from the objective lens is focussed on the recorded surface of the optical disc. Then, if the converged beam from the objective lens is focussed at a position before or after the position of the optical disc, the detecting surface 25 of the photodetector is equivalently displaced in position to a point $\alpha$ before the point O' or to a point $\beta$ thereafter. Accordingly, the spot 24' on the detecting surface 25 of the photodetector becomes ellipses as shown in FIGS. 12 and 14. Specifically, the ellipse spot 24' in FIG. 12 has the major axis extending in the first and third quadrants I and III along the direction with an angle of 45° relative to the x-axis, while the spot in FIG. 14 has the major axis extending in the second and fourth quadrants II and IV along the direction with an angle of 45° relative to the x-axis. In FIGS. 12 to 14, axes, a' to d' respectively correspond to the axes a to d in FIG. 10.

Therefore, if the detecting surface 25 of the photodetector is larger than the spot 24', the converging state of light rays by the objective lens onto the optical lens is detected from the difference between the sum of the photodetected signals from the photodetecting sensors of the first and third quadrants I and III and the sum of the photodetected signals of the photodetecting sensors of the second and fourth quadrants II and IV, of the photodetecting sensors of 4 quadrants. As a result, the focussing servo can be made by moving the objective lens along its optical axis so as to reduce the above difference to zero.

However, in the focussing error signal detecting apparatus having the combination of the semicylindrical lens 21 and the four sensors of the photodetector, when the spot 24' on the photodetecting surface 25 of the photodetector is displaced in position from the states shown in FIGS. 12 to 14 in the X'-axis or Y'-axis direction, the accuracy of the focussing error signal is lowered by the amount corresponding to the above displacement.

In view of this, the assignee of this application has previously proposed a focussing error detecting apparatus which can produce a focussing error signal having high precision and excellent linearity.

An example of such previously proposed focussing error detecting apparatus being applied to the optical disc reproducing apparatus will hereinafter be described with reference to FIG. 15. Laser light from a laser light source (for example, a semiconductor laser light source) 1 is passed through the collimator lens 3, polarized beam splitter 2, ¼ wavelength plate 4 and objective lens 5 sequentially and is incident on the recorded surface 6 of the disc. On the recorded surface 6 of the disc is recorded, for example, audio or video information properly modulated on a carrier in the form of pits formed along a spiral track and which can be optically read. Then, the laser light reflected from the recorded surface 6 is passed through the objective lens 5, the ¼ wavelength plate 4, the polarized beam splitter 2 and a composite lens 30 and is incident on the photodetector 8.

Figure 16:
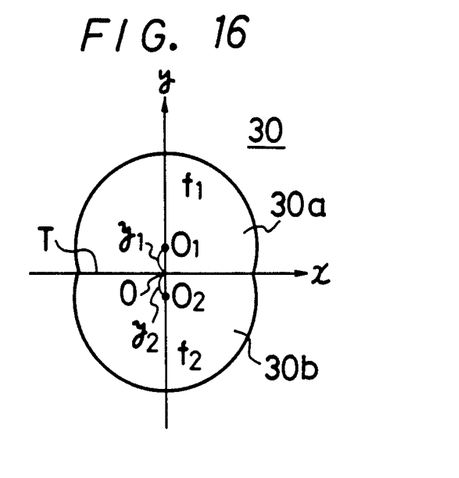
FIG. 16 is a plan view of a composite lens used in the apparatus in FIG. 15.
Figure 18:
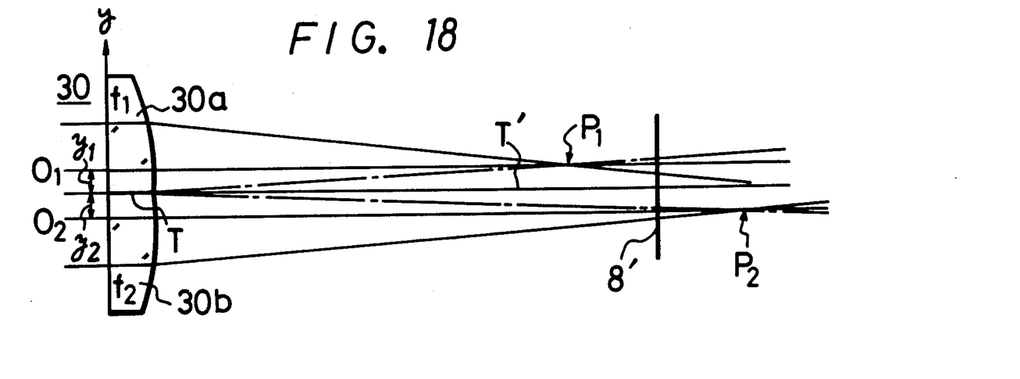
FIG. 18 is a diagram showing a positional relation of the composite lens and photodetector of the apparatus in FIG. 15.

The composite lens 30 consists of a pair of, for example, convex lens regions 30a and 30b divided by a flat interface T including the optical axis O of the light incident on the composite lens 30 as shown in FIGS. 16 and 18. The paired lens regions 30a and 30b respectively have different back focal lengths $f_1$ and $f_2$ and the optical axes $O_1$ and $O_2$ of the lens regions 30a and 30b are separated from each other by a predetermined distance. As shown in FIG. 16, the composite lens 30 is positioned on the x-y plane perpendicular to the optical axis O of the incident light with its flat interface T made coincident with the x-axis. In this example, the optical axes $O_1$ and $O_2$ of the respective lens regions 30a and 30b pass the points on the y-axis, which are respectively separated by distances $y_1$ and $y_2$ on the opposite sides of the flat interface T. This composite lens 30 may be formed by bonding a pair of separate lens regions 30a and 30b made of glass, plastic or the like or by integrally molding the regions with plastic or the like. Although for convenience of explanation the configuration of the lens 30 is not circular in the drawings formed, it is practical for the lens 30 to be formed circular. The following other examples have a similar lens 30.

Further, as shown in FIG. 18, the photodetector 8 is disposed in such a manner that the photodetecting surface 8' is positioned on the optical axis O of the incident light at the position intermediate between the points $P_1$ and $P_2$ (which are respectively positioned on the optical axis $O_1$ and $O_2$ on opposite sides of a plane T' extending from the flat interface T) at which the light beams emerging from the pair of lens regions 30a and 30b are in the focussed state, or in this example when the light rays incident on the composite lens 30 are parallel to each other. As shown in FIG. 17, the photodetector 8 consists of first and second photodetecting sensors 8B and 8A for receiving light rays passed through the far-side portion and the near-side portion of the first lens region 30a of the pair of lens regions 30a and 30b relative to the flat interface T and of third and fourth photodetecting sensors 8D and 8C for receiving light rays passed through the far-side portion and near-side portion of the second lens region 30b of the pair of lens regions 30a and 30b relative to the flat interface T. In this example, the first to fourth photodetecting sensors are rectangular and sequentially disposed in one direction (for example, in the direction of the track on the recorded surface of the disc) in the order of 8A to 8D. In this case, the photodetecting sensors 8B and 8C may be formed integral.

The focussing error signal (see FIG. 20) is obtained from the difference, $(S_B+S_C)-(S_A+S_D)$ between the sum, $S_B+S_C$ of the first and fourth photodetected signals $S_B$, $S_C$ from the first and fourth photodetecting sensors 8B and 8C and the sum, $S_A+S_D$ of the second and third photodetected signals $S_A$, $S_D$ from the second and third photodetecting sensors 8A and 8D. This focussing error signal is supplied to the control coil 9 as the focus control signal.

Figure 17B:
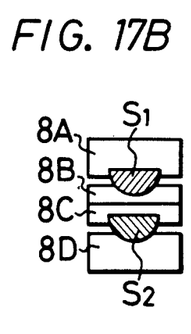

The operation of the example in FIG. 15 will be described with reference to FIG. 17. When the recorded surface 6 of the disc is at a proper position relative to the objective lens 5 so that the precisely focussed state is brought about, as shown in FIG. 17B the collimated light rays are incident on the composite lens 30 and focussed to form the semicircular spots $S_1$ and $S_2$ of the same size and oriented in the same direction on the sensors 8A, 8B and 8C, 8D of the photo detector 8. Accordingly, in this case, the focussing error signal becomes zero so that the objective lens 5 is kept at the same position.

Figures 15, 17A:
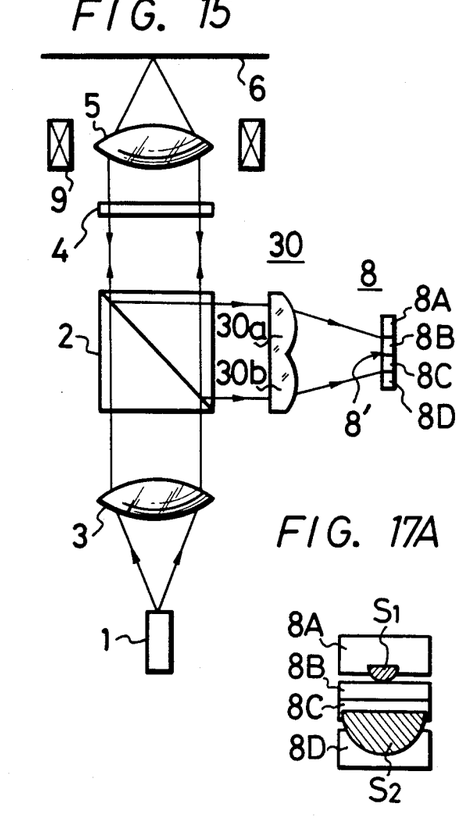
FIG. 15 is a diagram schematically showing an example of a previously proposed focussing error detecting apparatus by the same assignee of this application.
FIGS. 17A, 17B and 17C are plan views of a photodetector used in the apparatus in FIG. 15.

When the recorded surface 6 of the disc is positioned nearer to the objective lens 5 to bring the under-focussed state, the light incident on the composite lens 30 is slightly out of the collimated state so that as shown in FIG. 17A, the spots $S_1$ and $S_2$ on the photodetector 8 respectively appear as a small semicircle on the sensors 8A and 8B and a large semicircle oriented in the same direction on the sensors 8C and 8D. Accordingly, in this case, the focussing error signal becomes negative to drive the objective lens 5 to move away from the recorded surface 6.

Figure 17C:
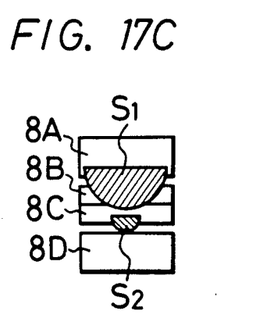

When the recorded surface 6 of the disc is positioned far from the objective lens 5 to bring the over-focussed state, the light incident on the composite lens 30 is slightly out of the collimated state in the opposite direction so that as shown in FIG. 17C the spots $S_1$ and $S_2$ on the photodetector 8 respectively appear as a large semicircle on the sensors 8A and 8B and a small semicircle oriented in the same direction on the sensors 8C and 8D. Accordingly, in this case, the focussing error signal becomes positive to drive the objective lens 5 to move toward the recorded surface 6.

Thus, the focussing error, namely, the distance between the disc and the objective lens 5, is detected by the composite lens 30 and the photodetector 8 formed of the four photodetecting sensor 8A and 8D arranged in one direction. This error signal is supplied to the control coil 9 as the focus control signal so that the objective lens 5 is automatically controlled to bring the precisely focussed state at all times, or to be positioned at a constant distance from the disc.

Figures 21, 22, 23A, 23B, 23C:
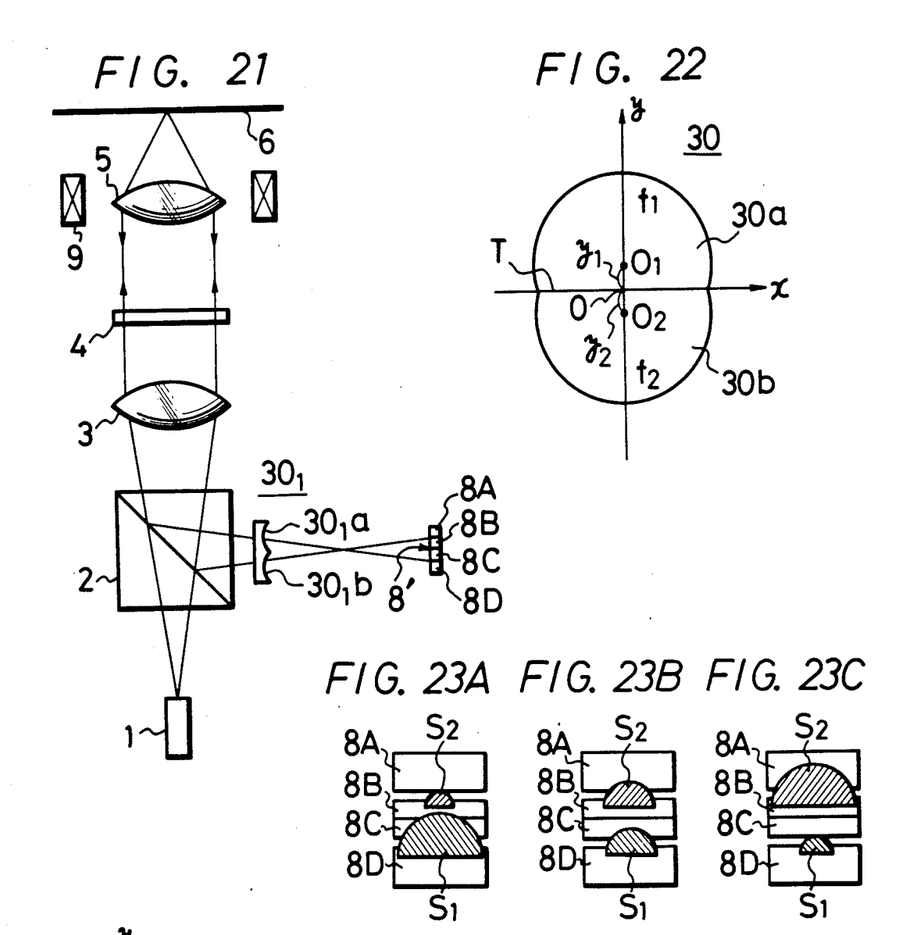
FIG. 21 is a diagram schematically showing another example of the previously proposed focussing error detecting apparatus.
FIG. 22 is a plan view of a composite lens used in the apparatus in FIG. 21.
FIGS. 23A, 23B and 23C plan views of a photodetector used in the apparatus in FIG. 15.

Another example of such previously proposed optical disc reproducing apparatus will be described with reference to FIG. 21. As shown in FIG. 21, in this example, the composite lens 30 consists of a pair of concave lens regions 30a and 30b. Laser light from the laser light source (for example, a semiconductor laser light source) 1 is passed through the polarized beam splitter 2, collimator lens 3, ¼ wavelength plate 4 and objective lens 5 in turn and is incident on the recorded surface 6 of the disc. On the recorded surface 6 of the disc is recorded, for example, an audio or video information properly modulated on a carrier in the form of pits formed along a spiral track and which can be optically read. The laser light reflected from the recorded surface 6 is passed through the objective lens 5, the ¼ wavelength plate 4, the collimator lens 3, the polarizing beam splitter 2 and the composite lens 30 in turn and is incident on the photodetector 8.

Figure 24:
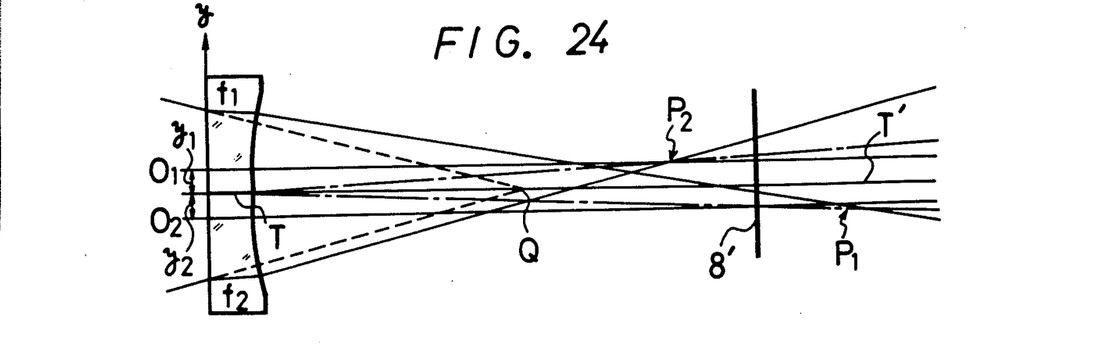
FIG. 24 is a diagram showing a positional relation between the composite lens and photodetector of the apparatus in FIG. 21.
Figure 25:
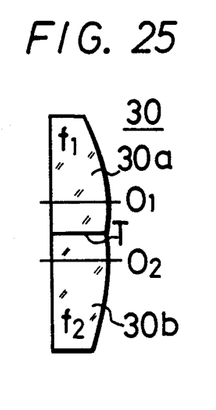
FIGS. 25 to 28 are respectively cross-sectional diagrams of examples of composite lenses used in the previously proposed focussing error detecting apparatus.
Figure 26:
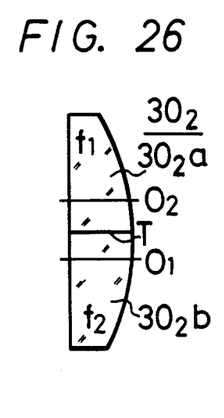

The composite lens 30 consists of a pair of, for example, concave lens regions 30a and 30b divided by a flat interface T therebetween which includes the optical axis O of the light incident on the composite lens 30 as shown in FIGS. 22 and 24. The paired lens regions 30a and 30b have different back focal lengths $f_1$ and $f_2$ and the optical axis $O_1$ and $O_2$ of the pair of lens regions 30a and 30b are spaced from each other. In case of FIG. 22, the composite lens 30 is positioned on the x-y plane which makes a right angle with the optical axis O of the incident light with the flat interface T made coincident with the x-axis. Here, the optical axes $O_1$ and $O_2$ of the lens regions 30a and 30b respectively pass the points lying on the y-axis and separated by distances y1 and y2 from the flat interface T in the opposite directions.

The photodetector 8 is positioned in such a manner that as shown in FIG. 24, the photodetecting surface 8' is placed on the optical axis O at a position intermediate between the points $P_1$ and $P_2$ (which are positioned on the optical axes $O_2$ and $O_1$ on the opposite sides of the plane T' extending from the flat interface T) where the light rays existing from the pair of lens regions 30a and 30b are focussed when the light incident on the composite lens 30 is in the focussed state, or when the incident light is converged toward a virtual point Q. The photodetector 8 as shown in FIG. 23 consists of first and second photodetecting sensors 8C and 8D for receiving the light rays respectively passed through the far-side portion and near-side portion of the first lens region 30a of the pair of lens regions 30a and 30b relative to the flat interface T and third and fourth photodetecting sensors 8A and 8B for receiving light rays respectively passed through the far-side portion and near-side portion of the second lens region 30b of the pair of lens regions 30a and 30b relative to the flatin terface T. Here, the first to fourth photodetecting sensors are rectangular and sequentially arranged in one direction (for example, in the direction of the track of the recorded surface of the disc) in the order of 8A to 8D. In this case, the photodetecting sensors 8B and 8C may be formed integral.

Then, the focussing error signal is obtained from the difference $(S_C+S_B)-(S_D+S_A)$ between the sum $S_C+S_B$ of the first and fourth photodetected signals $S_C$, $S_B$ from the first and fourth light detecting sensors 8C, 8B and the sum $S_D+S_A$ of the second and third photodetected signals $S_D$, $S_A$ from the second and third photodetecting sensors 8D, 8A. This focussing error signal is supplied to the control coil 9 as the focussing control signal.

The operation of the example in FIG. 21 will be described with reference to FIG. 23. When the recorded surface 6 of the disc is at a proper position relative to the objective lens 5 to bring the precisely focussed state, light converged toward the virtual point Q is incident on the composite lens 30 so that as shown in FIG. 23B, the spots $S_1$ and $S_2$ on the photodetector 8 respectively appear as semicircles of the same size and orienting in the same direction on the sensors 8C, 8D and sensors 8A, 8B. Accordingly, in this case, the focussing error signal becomes zero so that the objective lens 5 is kept at the same position.

When the recorded surface 6 of the disc is positioned closer to the objective lens 5 to bring the under-focussed state, the light incident on the composite lens 30 is slightly out of the precisely focussed state so that, as shown in FIG. 23A, the spots $S_1$ and $S_2$ on the photo detector 8 respectively appear as a large semicircle on the sensors 8C, 8D and a small semicircle oriented in the same direction on the sensors 8A, 8B. Accordingly, in this case, the focussing error signal becomes negative to drive the objective lens 5 to move away from the recorded surface 6.

When the recorded surface 6 of the disc is positioned far from the objective lens 5 to bring the over-focussed state, the light incident on the composite lens 30 is slightly out of the precisely focussed state in the opposite direction so that, as shown in FIG. 23C, the spots $S_1$ and $S_2$ on the photodetector 8 respectively appear as a small semicircle on the sensors 8C and 8D and a large semicircle oriented in the same direction on the sensors 8A and 8B. Accordingly, in this case, the focussing error signal becomes positive to drive the objective lens 5 to move toward the recorded surface 6.

As set forth above, the focussing error, namely the distance between the disc and the objective lens 5 is detected by the composite lens 30 and the photodetector 8 formed of four photodetecting sensors 8A to 8D arranged in one direction. This error signal is supplied to the control coil 9 as the focussing control signal so that the objective lens 5 is automatically controlled to bring the precisely focussed state, or to be positioned at a constant distance from the disc.

Figures 27, 28:
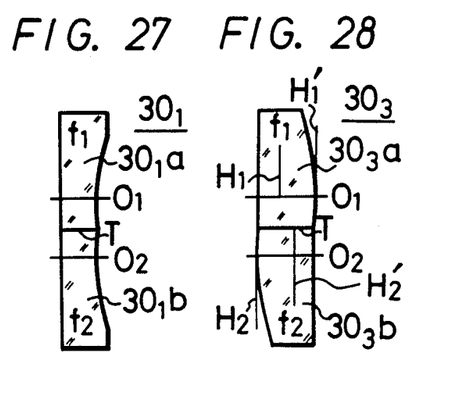
Figure 29:
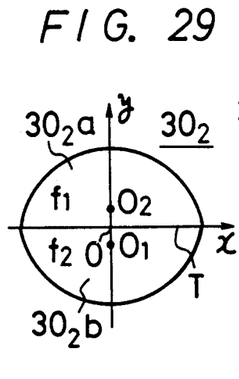
FIGS. 29 to 31 are respectively plan views of examples of composite lenses used in the previously proposed focussing error detecting apparatus.
Figure 30:
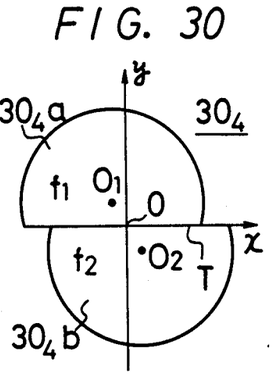
Figure 31:
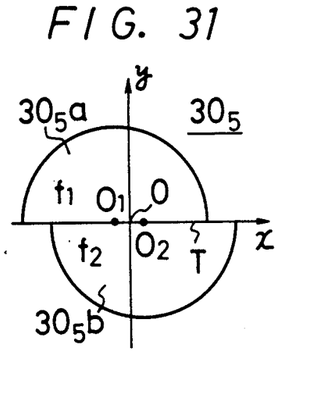

Examples of composite lens 30 will be described with reference to FIGS. 25 to 31. In the composite lens 30 shown in FIG. 25, the pair of lens regions 30a and 30b are both formed of convex lenses, while in the composite lens shown in FIG. 27 the pair of lens regions 30a and 30b are both formed of concave lenses. In both examples, the optical axis $O_1$ and $O_2$ of the paired lens regions 30a and 30b respectively exist within the lens regions 30a and 30b themselves. In the composite lenses 30 shown in FIGS. 26 and 29, the optical axes $O_1$ and $O_2$ of the pair of lens regions 30a and 30b respectively exist within the other lens regions 30b and 30a. Although not shown, both the optical axes $O_1$ and $O_2$ of the pair of lens regions 30a and 30b may be positioned in any one of the lens regions. Also as shown in FIG. 28, it is possible that the lens of the same power are used as the pair of lens regions 30a and 30b and combined to have different major surfaces $H_1$, $H_1'$ and $H_2$, $H_2'$. Furthermore, it is possible that when the composite lens 30 is placed on the x-y plane so that the flat interface T therebetween coincides with the x-axis, the optical axes $O_1$ and $O_2$ are positioned on the y-axis at positions on opposite sides of the flat interface T as shown in FIGS. 16, 22 and 29, on neither of the x-axis and y-axis at positions on opposite sides of the flat interface T as shown in FIG. 30, or on the x-axis, namely on the flat interface T as shown in FIG. 31.

Figure 32:
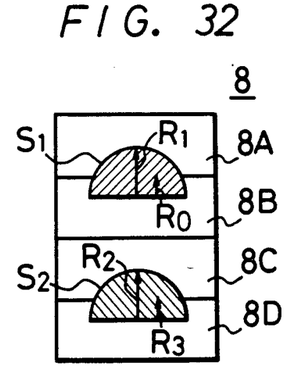
FIGS. 32 and 33 are respectively plan views of examples of photodetectors used in the previously proposed focussing error detecting apparatus.
Figure 33:
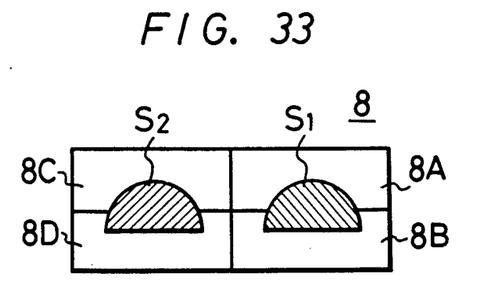

In addition, the arrangement of the photodetecting sensors 8A to 8D of the photodetector 8 can be selected in response to each positional relation between the optical axes $O_1$ and $O_2$ of the composite lens 30. FIG. 32 illustrates the arranging state (substantially the same as that in FIG. 17) of the photodetecting sensors 8A to 8D of the photodetector 8 when the optical axes of pair of lens regions 30a and 30b of the composite lens 30 are positioned at the points on the y-axis and on the opposite sides of the flat interface T as shown in FIG. 16. Such arrangement can be used for the case where the optical axes $O_1$ and $O_2$ of the composite lens 30 are displaced a little from the y-axis as shown in FIG. 30. When the optical axes $O_1$ and $O_2$ of the pair of lens regions 30a and 30b of the composite lens 30 exist at points on the x-axis, namely, on the flat interface T, the photodetecting sensors 8A to 8D of the photodetector 8 are arranged in two rows of two sensors each as shown in FIG. 33.

In addition, as shown in FIG. 32, if the radiuses of the semicircular spots $S_1$ and $S_2$ on the photodetecting sensors 8A, 8B and 8C, 8D of the photodetector 8 are represented by $R_1$ and $R_2$, the lengths of the spots $S_1$ and $S_2$ on the photodetecting sensors 8B and 8D by $R_0$ and $R_3$ (where the widths of the dead zones between the photodetecting sensors 8A to 8D are neglected), and the relation among these lengths $R_0$ to $R_3$ is selected to satisfy $(R_0/R_1)=(R_3/R_2)$, then the focussing error signal $(S_A+S_D) \sim (S_B+S_C)$ resulting from the calculation of the photodetected signals $S_A$ to $S_D$ upon precise focussing can be reduced to zero even if $R_1=R_2$ is not satisfied. When $R_1=R_2$, the amount of light incident on the photodetecting sensors 8A and 8C must be equal to the amount of light incident on the photodetecting sensors 8B and 8D and thus, regardless of $R_0(=R_3)$, it is possible to reduce the focussing error signal to zero upon precise focussing.

The above focussing error detecting apparatus in the respective examples have the following advantages. Since the focussing error signal is obtained from the sum $\{(S_A \sim S_C)+(S_D \sim S_B)=(S_A+S_D) \sim (S_D+S_C)\}$ of the difference $S_A \sim S_C$ (or $S_D \sim S_B$) between the photodetected signals produced from the photodetecting sensors for the light rays passed through the far-side portions of the lens regions 30a and 30b of the composite lens 30 relative to the flat interface T and the difference $S_D \sim S_B$ (or $S_A \sim S_C$) between the photodetected signals produced from the photodetecting sensors for the light rays passed through the near-side portions of the lens regions 30a and 30b relative to the flat interface T, this focussing error signal is good in accuracy due to the fact that high-frequency signals leaked in owing to the diffraction in the pits of the disc and difference in the modulation degrees of light relative to the spatial frequency of pits at the center and periphery of the spots are cancelled.

Figure 19:
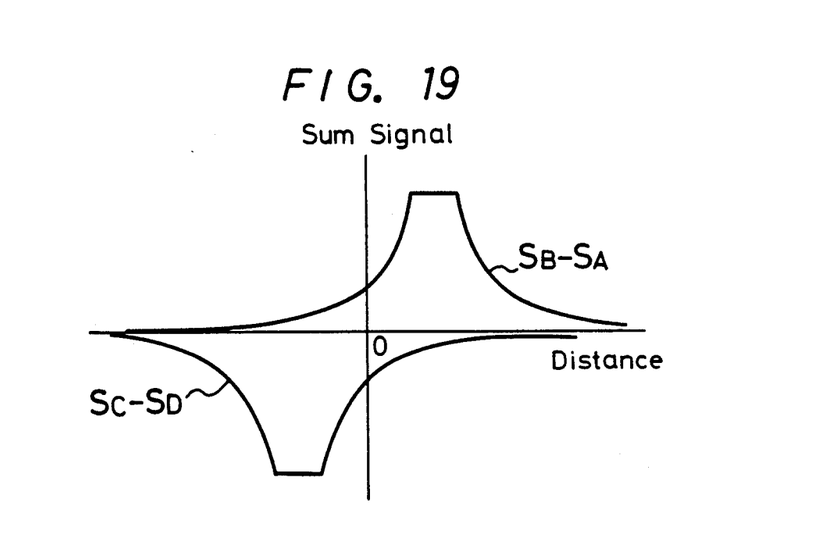
FIGS. 19 and 20 are respectively graphs useful for explaining the apparatus in FIG. 15.
Figure 20:
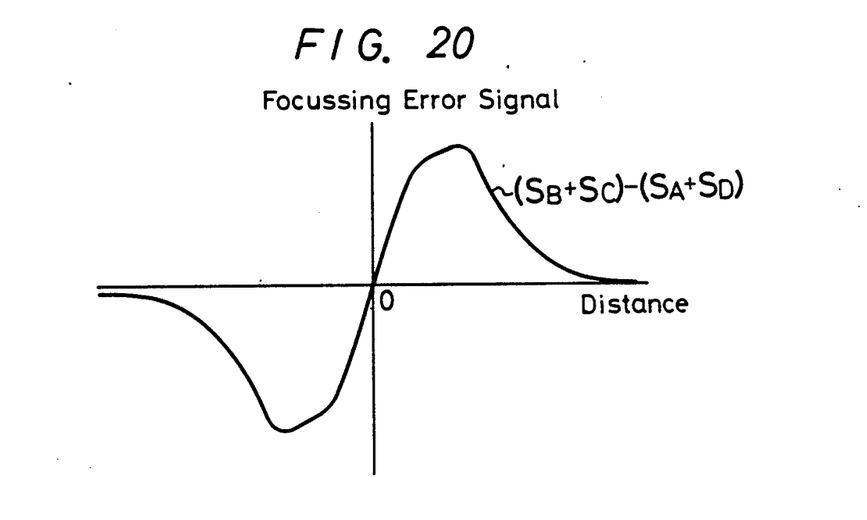

Also, since the focussing error signal is obtained from the sum $\{(S_A+S_D) \sim (S_B+S_C)\}$ of the difference $S_A-S_B$ (or $S_B-S_A$) between the photodetected signals produced from the photodetecting sensors for the light rays passed through the far-side portion and near-side portion of the lens region 30a of the composite lens 30 relative to the flat interface T and the difference $S_D-S_C$ (or $S_C-S_D$) between the photodetected signals produced from the photodetecting sensors for the light rays passed through the near-side portion and far-side portion of the lens region 30b of the composite lens 30 relative to the flat interface T, difference signals $S_B-S_A$ and $S_C-S_D$ are symmetrical (see FIG. 19), and thus the focussing error signal has excellent linearity as shown in FIG. 20.

Furthermore, as shown in FIG. 32, if the radiuses of the semicircular spots $S_1$ and $S_2$ on the photodetecting sensors 8A, 8B and 8C, 8D of the photodetecting 8 are represented by $R_1$ and $R_2$, and the lengths of the spots $S_1$ and $S_2$ on the photodetecting sensors 8B, 8D by $R_0$ and $R_3$ (the widths of the dead zones between the photodetecting sensors 8A to 8D are neglected), the amount of light incident on the photodetecting sensors 8A and 8C is equal to the amount of light incident on the photodetecting sensors 8B and 8D under the condition of $R_1=R_2$ and thus, it is possible to reduce the focussing error signal to zero upon precise focussing irrespective of $R_0(=R_3)$. Accordingly, even if the spots $S_1$ and $S_2$ on the photodetector 8 are displaced in the arranging direction of the photodetecting sensors 8A, 8B and 8C, 8D, the precision of the focussing error signal is not lowered.

By the way, since the composite lens 30 used in the above focussing error detecting apparatus is complicated in shape and structure, if plastic is used as its material, the composite lens 30 can be produced easily as compared with a case in which glass is used as the material of the composite lens. However, the plastic lens has the large changing ratio of the focal length by the temperature as compared with that of the glass lens. Accordingly, if the composite lens 30 made of the plastic lens is applied to the above focussing error detecting apparatus and combined with the photodetector to obtain the focussing error signal, offset is caused in the focussing error signal in accordance with the change of temperature so that the precision of the focussing servo for the objective lens is lowered.

Figure 34:
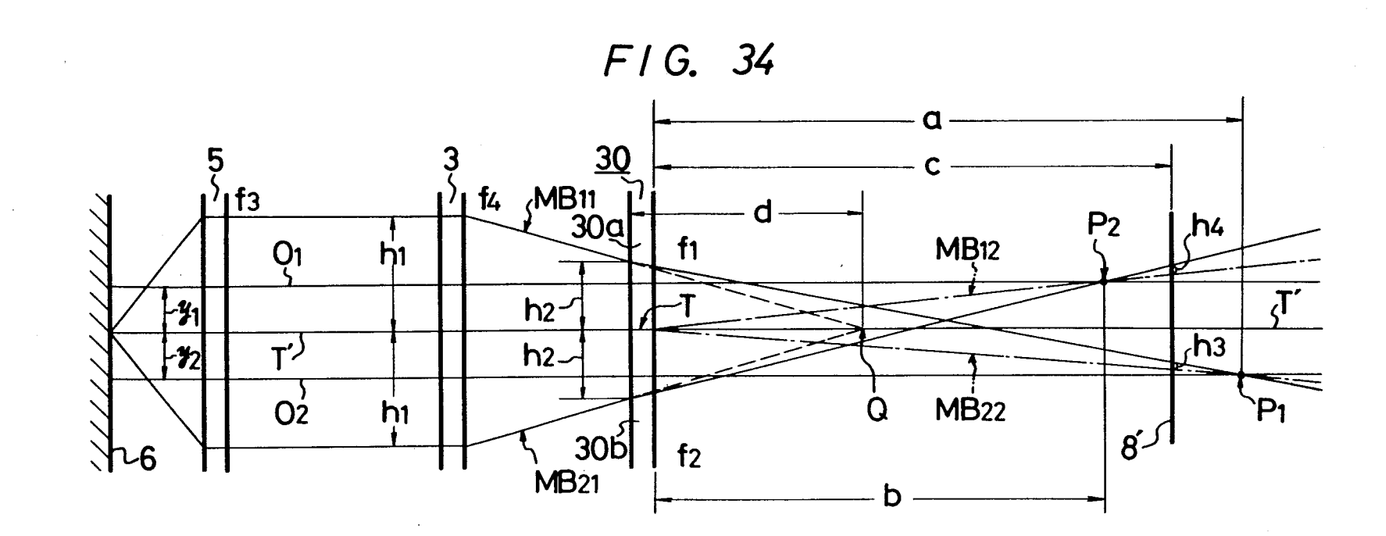
FIG. 34 is a diagram showing the optical system useful for explaining the function of the lens used in the previously proposed focussing error detecting apparatus.

FIG. 34 shows with the aid of a mathmatical formula how the converged state of the converging beam from the objective lens 5 on the recorded surface 6 of the optical disc by the optical disc reproducing apparatus of, for example, FIG. 21 is changed by the temperature change. In FIG. 34, the objective lens 5, the collimator lens 3 and the composite lens (concave lens) 30 (see FIGS. 21, 22 and 24) are represented by lines corresponding to the first and second major surfaces. Reference characters $BM_{11}$, $BM_{21}$ and $BM_{12}$, $BM_{22}$ designate light rays which are respectively incident on the outermost peripheries of the first and second lens regions 30a, 30b of the lens 30 and the flat interface T. In this case, the relation between the focal lengths $f_1$ and $f_2$ of the first and second lens regions 30a and 30b is selected as, for example, $f_1<f_2$. The refractive index of the lens 30 is made uniform and taken as n. Further, the focal lengths of the objective lens 5 and the collimator lens 3 are respectively taken as $f_3$ and $f_4$. The lengths from the second major surface of the lens 30 to converged points P1 and P2 along the direction of a plane T' are respectively taken as a and b. The length from the second major surface of the lens 30 to a photodetecting surface 8' along the direction of the plane T' is taken as c. The length between the first major surface of the lens 30 and a conjugate point Q of a beam incident thereon (converged beam) along the direction of the plane T' is taken as d. Further, the heights of the light rays $MB_{11}$, $MB_{21}$ incident on the lens 3 at its outermost periphery from the plane T' are respectively taken as $h_1$, while the heights of the light rays $MB_{11}$, $MB_{21}$ incident on the lens 30 from the plane T' are respectively taken as $h_2$.

Then, the heights $h_1$ and $h_2$ are respectively expressed by the following equations.

$$h_1 = f_3 \cdot NA_5 \quad (1)$$

$$h_2 = \frac{d}{f_4} \cdot h_1 \quad (2)$$

where $NA_5$ represents the N.A. (numerical aperture) of the objective lens 5.

From the formula of lens, the following equations are established among a, b, d, $f_1$ and $f_2$.

$$-\frac{1}{d} + \frac{1}{a} = \frac{1}{f_1} \quad (3)$$

$$-\frac{1}{d} + \frac{1}{b} = \frac{1}{f_2} \quad (4)$$

From the equations (3) and (4), a and b are respectively expressed by the following equations.

$$a = \frac{df_1}{d+f_1} \quad (5)$$

$$b = \frac{df_2}{d+f_2} \quad (6)$$

If the height from a point at which the light ray $MB_{22}$ is incident on the photodetecting surface 8' to a point at which the light ray $MB_{11}$ is similarly incident thereon is taken as $h_3$ and the height from a point at which the light ray $MB_{12}$ is incident on the photodetecting surface 8' to a point at which the light ray $MB_{21}$ is similarly incident thereon is taken as $h_4$, the heights $h_3$ and $h_4$ are respectively expressed by the following equations.

$$h_3 = \frac{h_2(a-c)}{a} \quad (7)$$

$$h_4 = \frac{h_2(c-b)}{b} \quad (8)$$

If $h_3 = h_4 \equiv h_5$ in the equations (7) and (8), c and $h_5$ are respectively expressed by the following equations.

$$c = \frac{2ab}{a+b} \quad (9)$$

$$h_5 = \frac{h_2(b-a)}{a+b} \quad (10)$$

If the equations (5) and (6) are substituted in the equation (9), the following equation is obtained.

$$c = \frac{2df_1f_2}{d(f_1+f_2)+2f_1f_2} \quad (11)$$

In general, when the radiuses of curvature of both surfaces of a lens are taken as $R_1$, $R_2$ and the refractive index thereof is taken as n, the focal length f of the lens can be expressed as follows.

$$\frac{1}{f} = (n-1)\left(\frac{1}{R_1} - \frac{1}{R_2}\right) \quad (12)$$

The relation of the change of focal length f to the change of the refractive index n caused by the change of temperature T is expressed by the following equation.

$$\frac{1}{f} \cdot \frac{df}{dT} = \frac{-1}{n-1} \cdot \frac{dn}{dT} \quad (13)$$

Then, the changing ratio dc/dT of the length c relative to the change of temperature T is searched for. Modifying the equation (11) yields the following equation $$\frac{1}{c} = \frac{1}{2}\left(\frac{1}{f_1} + \frac{1}{f_2} + \frac{1}{d}\right) \quad (14)$$

Differentiating c, $f_1$ and $f_2$ in the equation (14) by T yields $$\frac{1}{c^2}\frac{dc}{dT} = \frac{1}{2}\left[\frac{1}{f_1^2}\cdot\frac{df_1}{dT} + \frac{1}{f_2^2}\cdot\frac{df_2}{dT}\right] \quad (15)$$

Accordingly, dc/dT is modified into the following equation if the equations (13) and (14) are substituted for the equation (15) and $df_1/dT = df_2/dT$ is taken $$\frac{dc}{dT} = c^2\left(\frac{1}{c} - \frac{1}{d}\right)\cdot\frac{-1}{n-1}\cdot\frac{dn}{dT} \quad (16)$$

The change of the length c corresponds to the defocussed amount $\Delta Z(=\Delta c/2\beta^2)$ on the recorded surface 6 of the disc where $\beta$ is the longitudinal magnification {the composite focal length $f_1$ (or $f_2$) divided by $f_3$}. $\Delta Z$ is expressed by the following equation.

$$\Delta Z = \frac{-1}{(n-1)\cdot 2\beta^2}\cdot\left(c - \frac{c^2}{d}\right)\cdot\frac{dn}{dT}\cdot\Delta T \quad (17)$$

When acryl is used as the material of the lens 30, dn/dT becomes $1.4\times 10^{-4}$ (per 1° C.). When the temperature change $\Delta T$ is 30° C., the defocussed amount $\Delta Z$ is 1 μm so that it becomes difficult to detect the focussing error with high precision wherein $f_1 = -10$ mm, $f_2 = -11$ mm, $d = 6.18$ mm and $n = 1.486$.

OBJECTS AND SUMMARY OF THE INVENTION

Accordingly, it is an object of the present invention to provide a focussing error detecting apparatus which can obviate the above defects inherent in the prior art focussing error detecting apparatus.

It is another object of the present invention to provide a focussing error detecting apparatus capable of producing a focussing error signal of high precision and excellent linearly.

It is a further object of the present invention to provide a focussing error detecting apparatus suitable for use with an optical disc reproducing apparatus, an autofocus camera and so on.

It is a still further object of the present invention to provide a composite lens for use with a focussing error detecting apparatus and which can easily be produced.

It is a yet further object of the present invention to provide a composite lens for use with a focussing error detecting apparatus and which can produce a focussing error signal with excellent precision regardless of the change of temperature.

According to one aspect of the present invention, there is provided a focussing error detecting apparatus comprising:

a composite lens formed of a single lens made of glass and a single lens made of plastic; and a photodetector disposed behind said composite lens in opposed relation thereto, wherein said glass single lens has a uniform focal length, said plastic single lens is formed of a pair of lens regions divided by a flat interface including an optical axis of light incident on said composite lens, said pair of lens regions have back focal lengths different from each other and optical axes spaced apart from each other, said photodetector is placed so that its photodetecting face is positioned at a middle point between converged points of light rays emitted from said pair of lens regions on the optical axis of said incident light when said light incident on said composite lens is in the focussed state and said photodetector is formed of first and second photodetecting sensors for receiving light rays passed through the portions of said first lens region of said pair of lens regions which are respectively spaced apart from and adjacent to said flat interface and third and fourth photodetecting sensors for receiving light rays passed through portions of said second lens region of said pair of lens regions which are respectively spaced apart from and adjacent to said flat interface so that a focussing error signal is produced from the difference between the sum of first and fourth photodetected signals, from said first and fourth photodetecting sensors and the sum of second and third photodetected signals from said second and third photodetecting sensors.

The other objects, features and advantages of the present invention will become apparent from the following description taken in conjunction with the accompanying drawings through which the like references designate the same elements and parts.

DESCRIPTION OF THE PREFERRED EMBODIMENT

Now, an embodiment of the focussing error detecting apparatus according to the present invention will hereinafter be described with reference to FIGS. 35 and 36. In this case, however, only a composite lens used therein will be described and the construction of the whole of the focussing error detecting apparatus of the invention will be omitted because the whole of the focussing error detecting apparatus is constructed as in FIG. 15 et seq.

Figure 35:
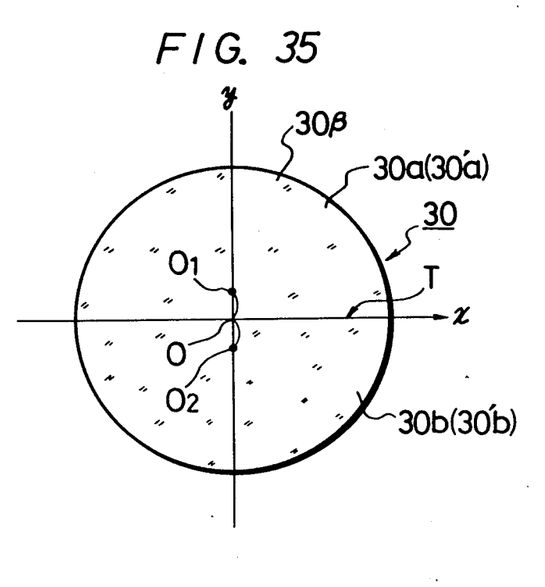
FIGS. 35 and 36 are respectively a plan view and a cross-sectional view showing an example of a composite lens used in an embodiment of a focussing error detecting apparatus according to the present invention.
Figure 36:
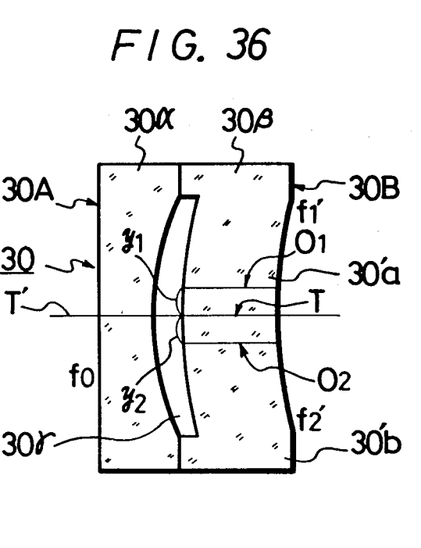

In FIGS. 35 and 36, reference numeral 30 designates the whole of a composite lens (concave lens corresponding to the composite lens 30 shown in FIGS. 22 and 24 and used in the apparatus shown in, for example, FIG. 21). The composite lens 30 consists of a glass single lens 30α and a plastic single lens 30β which are bonded together along their peripheries, for example. The glass signal lens 30α is a uniform lens having its optical axis on a flat interface T' and the focal length of which is $f_0$ (positive or negative). In this embodiment, the glass single lens 30α is a concave lens of flat concave type (in this embodiment, the focal length $f_0$ is $-10.5$ mm, for example). The plastic single lens 30β is, for example, a concave and convex type lens. Reference numeral 30γ designates a space defined between the single lenses 30α and 30β.

As shown in FIG. 35, the plastic single lens 30β includes lens regions 30'a and 30'b which are vertically halved by the boundary flat interface T (x-axis) including an optical axis O of incident light. The focal length (back focal length) of the first lens region 30'a is taken as $f'_1$ and the focal length (back focal length) of the second lens region 30'b is taken as $f'_2$. The optical axes $O_1$ and $O_2$ of the respective lens regions 30'a and 30'b are spaced apart on the y-axis by predetermined lengths $y_1$ and $y_2$ relative to the optical axis O (boundary flat interface T) of the incident light as in FIGS. 22 and 24. The focal lengths $f'_1$ and $f'_2$ may be either positive or negative in general if $f'_1 \neq f'_2$. Also it is possible that any one of the focal lengths $f'_1$ and $f'_2$ is $\infty$. In this embodiment, the focal lengths $f'_1$ and $f'_2$ are respectively selected to be $-210$ mm and 231 mm. The outline of the composite lens 30 may be arbitrary but is practical when formed circular as shown in FIG. 35.

The lens regions 30'a and 30'b of the single lens 30β and the corresponding lens regions of the single lens 30α constitute lens regions 30a and 30b of the composite lens (flat concave lens) 30.

Such single lens 30β can be produced in two ways, one of which is to make lens regions made of plastic lens materials of two kinds having different refractive indexes such as acrylic material integral by bonding or the like and to mold and abrade the bonded lens regions to thereby produce the single lens 30β.

The other way is to mold or abrade lenses made of the same plastic material such as acrylic material but with different curvatures, namely, different focal lengths, divided the lenses in two and to make the lens regions thus obtained integral by bonding or the like to thereby produce the single lens 30β.

The changing ratio of the focal length or the like of the composite lens 30 thus formed relative to the change of the temperature will be discussed. If the refractive indexes of the glass single lens 30α and the plastic single lens 30β are respectively taken as nα and nβ, the changing ratios of the focal lengths $f_1$ and $f_2$ of the lens regions 30a and 30b relative to the temperature T will be expressed by the following equations with reference to the equation (13).

$$\frac{1}{f_1} \cdot \frac{df_1}{dT} = \frac{f_1}{f_0} \cdot \frac{-1}{n\alpha - 1} \cdot \frac{dn\alpha}{dT} + \frac{f_1}{f'_1} \cdot \frac{-1}{n\beta - 1} \cdot \frac{dn\beta}{dT} \quad (18)$$

$$\frac{1}{f_2} \cdot \frac{df_2}{dT} = \frac{f_2}{f_0} \cdot \frac{-1}{n\alpha - 1} \cdot \frac{dn\alpha}{dT} + \frac{f_2}{f'_2} \cdot \frac{-1}{n\beta - 1} \cdot \frac{dn\beta}{dT} \quad (19)$$

However, $dn\alpha/dT$ of the glass single lens 30α is $1.7 \times 10^{-6}$ (per 1° C.) in the case of $BK_7$ glass (substantially the same in the case of other glasses), while $dn\beta/dT$ of the plastic single lens 30β is $-1.4 \times 10^{-4}$ (per 1° C.) in the case of acryl (substantially the same in the case of other plastics). Consequently, as will be clear from the above, the condition of $dn\alpha/dT << dn\beta/dT$ is established between $dn\alpha/dT$ and $dn\beta/dT$. Thus, the above equations (18) and (19) can respectively be approximated as $$\frac{1}{f_1} \cdot \frac{df_1}{dT} \approx \frac{f_1}{f'_1} \cdot \frac{-1}{n\beta - 1} \cdot \frac{dn\beta}{dT} \quad (20)$$

$$\frac{1}{f_2} \cdot \frac{df_2}{dT} \approx \frac{f_2}{f'_2} \cdot \frac{-1}{n\beta - 1} \cdot \frac{dn\beta}{dT} \quad (21)$$

Moreover, $dc/dT$ when the composite lens 30 in FIGS. 35 and 36 is applied to the optical system in FIG. 34 can be expressed by the following equation with reference to the equations (15) and (16).

$$\frac{dc}{dT} = \frac{c^2}{2}\left(\frac{1}{f_1^2}\cdot\frac{df_1}{dT} + \frac{1}{f_2^2}\cdot\frac{df_2}{dT}\right) = \qquad(22)$$

$$\frac{c^2}{2}\cdot\frac{-1}{n\alpha-1}\cdot\frac{dn\beta}{dT}\cdot\left(\frac{1}{f_1}+\frac{1}{f_2}\right)$$

Accordingly, in order to reduce dc/dT, it is sufficient to make $(1/f'_1+1/f'_2)$ small. In other words, if $f_1$ and $f_2$ are determined, it is sufficient to make $f_1/f'_1$ and $f_2/f'_2$ small, respectively. Also, if $f'_1$ and $f'_2$ are selected to satisfy the condition of $f'_1/f'_2 = -1$, dc/dT can be reduced approximately to zero.

According to the complex lens 30 described just above, if as the glass single lens 30α has one optical axis and uniform focal length, the single, 30β is formed of plastic lens and two the lenses are bonded together to be the complex lens, the manufacturing process is simplified and the changing ratios of the focal lengths $f_1$ and $f_2$ of the lens regions 30a and 30b relative to the change of the temperature T can be made small.

Moreover, if the above composite lens 30 is combined with the photodetector described above, the offset appearing in the focussing error signal from the focussing error signal detecting apparatus caused by the temperature change can be reduced and hence the focussing error signal with excellent precision can be produced.

It is needless to say that the composite lens 30 used in the present invention can be applied to the examples of the modified complex lenses used in the examples of the previously proposed focussing error signal detecting apparatus shown in FIG. 15 and the following.

As set forth above, according to the present invention, the composite lens used in the focussing error detecting apparatus, can be made easily and the focussing error signal with excellent precision regardless of change of the temperature can be produced.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A focussing error detecting apparatus comprising: a composite lens formed of a single lens made of glass and a single lens made of plastic; and a photodetector disposed behind said composite lens in opposed relation thereto, wherein said glass single lens has a uniform focal length, said plastic single lens is formed of a pair of lens regions divided by a flat interface including an optical axis of light incident on said composite lens, said pair of lens regions have back focal lengths different from each other and optical axes spaced apart from each other, said photodetector is placed so that its photodetecting face is positioned at a middle point between converged points of light rays emitted from said pair of lens regions on the optical axis of said incident light when said light incident on said composite lens is in the focussed state, and said photodetector is formed of first and second photodetecting sensors for receiving light rays passed through portions of the first lens region of said pair of lens regions which are respectively spaced apart from and adjacent to said flat interface and third and fourth photodetecting sensors for receiving light rays passed through portions of the second lens region of said pair of lens regions which are respectively spaced apart from and adjacent to said flat interface so that a focussing error signal is produced from the difference between the sum of first and fourth photodetected signals from said first and fourth photodetecting sensors and the sum of second and third photodetected signals from said second and third photodetecting sensors.

2. A focussing error detecting apparatus according to claim 1, wherein the focal lengths of said pair of lens regions are selected so that $$f'_1/f'_2 = -1$$

where $f'_1$: the back focal length of said first lens region
$f'_2$: the back focal length of said second lens region.

* * * * *